J. C. STEVENS.
CULTIVATOR.

No. 189,513. Patented April 10, 1877.

Witnesses.
J. C. Clarke
J. C. Hubbell

Inventor.
J. C. Stevens
By H. N. Jenkins
Attorney.

UNITED STATES PATENT OFFICE.

JAMES C. STEVENS, OF PLEASANT HILL, LOUISIANA.

IMPROVEMENT IN CULTIVATORS.

Specification forming part of Letters Patent No. 189,513, dated April 10, 1877; application filed January 22, 1877.

*To all whom it may concern:*

Be it known that I, JAMES C. STEVENS, a resident of the town of Pleasant Hill, parish of De Soto, and State of Louisiana, have invented a certain new and useful Improvement in Cultivator and Seed-Coverer; and I do hereby declare the following to be a full, clear, and correct description of the same, reference being had to the annexed drawing, making a part of this specification.

This invention relates to the production of a new and improved farm implement, which is provided with suitable attachments for adapting it for use as a seed-coverer or cultivator. Its construction and merits will be readily understood by referring to the accompanying drawing, whereon—

Figure 1:
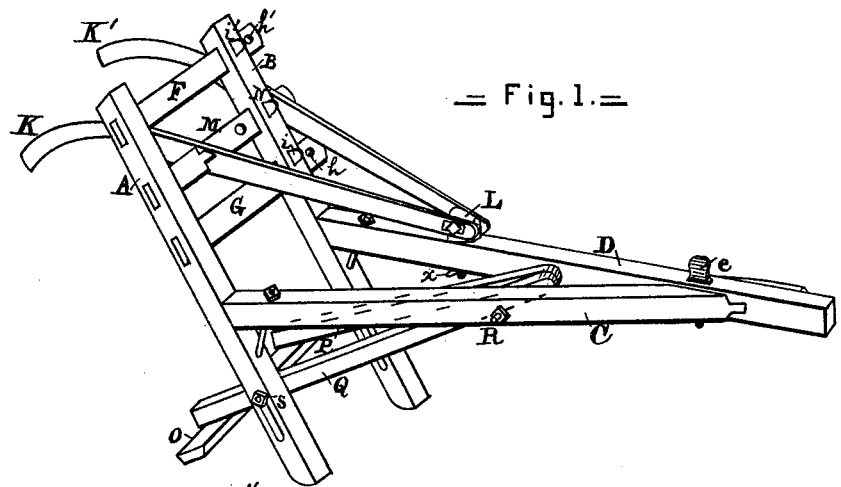
Figure 2:
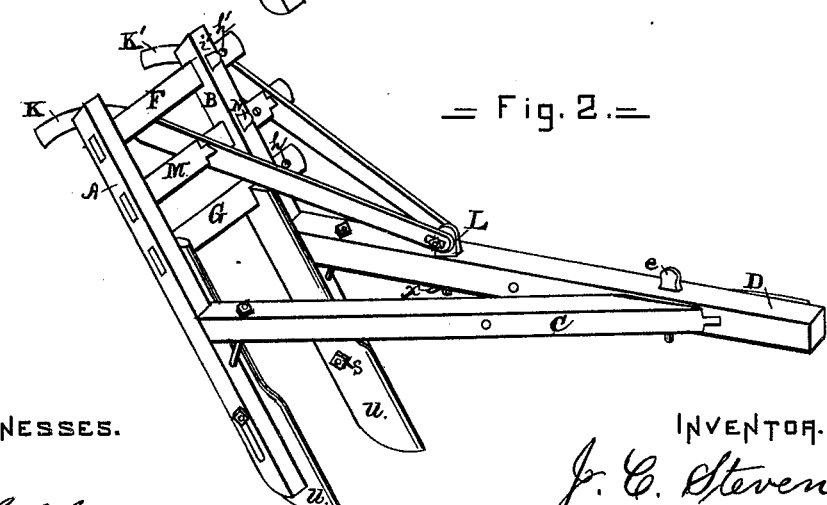

Figure 1 represents the implement as when ready for use as a seed-coverer; and Fig. 2, as when used for dirting young cotton or corn, &c.

This implement is drawn by a single animal, which is hitched to the front end of the main beam, as in ordinary plows; and it consists of a pair of standards, A B, which are, respectively, secured to the rear ends of the beams C and D. The latter have their forward ends pivoted together, as at e, so that the distance between the standards may be altered, when necessary, to conform to the rows or furrows operated on.

To the standard A are rigidly secured two tie-bars, F G, which are provided at their outer ends with two or more perforations, h h', in order that they may, by means of the pins i i', be secured to the upper portion of the standard B, and thereby secure the whole stock together.

The front ends of the handles K K' are bolted to the head of a pin, L, the shank of which is rounded, so that it may turn freely in a hole which is bored through the beam D to receive it, and in which it is held by a key, x, which is fitted in a slot cut in that portion of the bolt which projects below the beam. The rear of the handles are held at the requisite distance apart by a bar, M, which is fitted in mortises cut through the standards. This bar may, with its handles, be shifted from right to left, in either of which positions it is held by a pin, N, which engages in one of a series of perforations cut therein.

O is a scraper, which is secured to the rear ends of the side arms P Q, operating inside of the standards on a bolt, R, which also serves to brace the beams D C and hold them together. The scraper is secured at any desirable elevation by means of bolts s s, which are inserted in slots cut in the rear ends of the aforesaid arms, and in the lower parts of the standards.

The cultivator-points being of the ordinary pattern, it is not deemed necessary to represent them on the drawing, and hence they are not referred to by letter in the specification.

It is only when the implement is used for covering seed that the scraper is used, its duty being to break the lumps of dirt which are thrown up by the cultivator-points.

When the implement is used for dirting, or, in other words, for throwing up dirt around young corn, cotton, &c., the handles are first shifted to the left, so that the implement shall straddle the row, while the horse and man shall travel on one side thereof. The cultivator-points and scraper are next removed, and the cutter-blades u secured to the inner sides of the standards, as shown at Fig. 2. These cut through the earth, and throw the loose portions thereof lightly up against the young plants.

Having described my invention, what I claim as new, and desire to secure by Letters Patent, is—

The combined cultivator and seed-coverer herein described, composed of the main beam D, the angular beam C, adjustable on the main beam, the slotted standards A B, the adjustable cross-bars F G M, and the laterally-adjustable handles K K', adapted to carry the covering devices O P Q or cultivator-teeth and shovels, substantially as shown and described.

In testimony whereof I have hereto set my hand.

J. C. STEVENS.

Witnesses:
W. P. HARRELL,
I. M. STODDARD.